United States Patent
Acciardi et al.

(10) Patent No.: US 7,742,257 B2
(45) Date of Patent: Jun. 22, 2010

(54) ACOUSTIC DAMPING PAD THAT REDUCES DEFLECTION OF A CIRCUIT BOARD

(75) Inventors: Edward G. Acciardi, Grafton, MA (US); A. David Michael, Auburndale, MA (US); Jonathan S. Haynes, Petersham, MA (US); Kimberly C. Mann, Worcester, MA (US); Michael D. Leis, Framingham, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 826 days.

(21) Appl. No.: 11/624,420

(22) Filed: Jan. 18, 2007

(65) Prior Publication Data

US 2007/0165328 A1 Jul. 19, 2007

Related U.S. Application Data

(60) Provisional application No. 60/759,806, filed on Jan. 18, 2006.

(51) Int. Cl.
  *G11B 33/08* (2006.01)
  *G11B 33/12* (2006.01)
(52) U.S. Cl. .................. 360/97.02; 720/651
(58) Field of Classification Search ............. 360/97.02, 360/97.03; 181/292, 293, 284, 286; 720/651; 361/679.33, 679.34, 736, 742
  See application file for complete search history.

(56) References Cited

U.S. PATENT DOCUMENTS

| | | | |
|---|---|---|---|
| 5,235,482 A | 8/1993 | Schmitz | |
| 5,483,397 A | 1/1996 | Gifford et al. | |
| 5,666,239 A | 9/1997 | Pottebaum | |
| 5,725,931 A * | 3/1998 | Landin et al. | 428/134 |
| 5,757,580 A | 5/1998 | Andress et al. | |
| 5,777,821 A | 7/1998 | Pottebaum | |
| 6,233,816 B1 * | 5/2001 | Franke et al. | 29/829 |
| 6,288,866 B1 | 9/2001 | Butler et al. | |
| 6,290,022 B1 * | 9/2001 | Wolf et al. | 181/292 |
| 6,411,463 B1 | 6/2002 | Janik et al. | |
| 6,496,326 B1 * | 12/2002 | Boutaghou | 360/97.03 |
| 6,498,700 B2 | 12/2002 | Takahashi et al. | |
| 6,609,592 B2 * | 8/2003 | Wilson | 181/292 |
| 6,674,608 B1 | 1/2004 | Bernett | |
| 6,697,217 B1 | 2/2004 | Codilian | |
| 6,720,069 B1 * | 4/2004 | Murakami et al. | 428/319.3 |
| 6,947,252 B2 | 9/2005 | Kang et al. | |
| 6,954,328 B2 | 10/2005 | Daniel et al. | |
| 6,954,329 B1 | 10/2005 | Ojeda et al. | |
| 6,958,884 B1 | 10/2005 | Ojeda et al. | |
| 7,643,243 B2 * | 1/2010 | Lee et al. | 360/97.02 |
| 2005/0098379 A1 * | 5/2005 | Sato et al. | 181/293 |
| 2006/0098332 A1 * | 5/2006 | Lee et al. | 360/97.02 |

\* cited by examiner

*Primary Examiner*—William J Klimowicz
(74) *Attorney, Agent, or Firm*—Leanne Taveggia Farrell; Westman, Champlin & Kelly, P.A.

(57) ABSTRACT

A acoustic damping pad is provided. The acoustic damping pad includes a first surface and an opposing second surface that are defined by a periphery. A first set of perforations extend between the first surface and the second surface of the acoustic damping pad. Each adjacent perforation in the first set of perforations is uniformly spaced apart from each other across a first select surface area of the first surface and across a corresponding first select surface area of the opposing second surface to form a uniform pattern.

20 Claims, 5 Drawing Sheets

ACOUSTIC DAMPING PAD THAT REDUCES DEFLECTION OF A CIRCUIT BOARD

CROSS REFERENCE TO RELATED APPLICATIONS

This application claims the benefit of U.S. Provisional Application 60/759,806 filed on Jan. 18, 2006 entitled "PERFORATED INSULATING PAD TO CONTROL CIRCUIT BOARD DEFLECTION," the entire disclosure of which is hereby incorporated by reference in its entirety.

BACKGROUND

A data storage system, such as a disc drive, includes a base and a top cover that houses a variety of internal components. Example internal components include one or more data storage discs, a spindle motor and a spindle hub. The disc(s) are mounted to the spindle hub and the spindle motor drives the spindle hub which rotates the disc(s). A disc drive also includes external components. An example external component includes a printed circuit board assembly (PCBA). The PCBA is attached to an outer surface of the base.

Acoustic noise can be generated from the rotation of the spindle motor and the attached disc(s). Acoustic noise can also be generated from the actuator assembly that supports read/write heads which read and write data to the storage disc(s). A base and top cover house internal components of the disc drive and can amplify the sources of acoustic noise discussed above. More specifically, the base and top cover can substantially add to acoustic noise due to their resonance characteristics.

Independent of acoustic noise, mechanical resonance associated with components of the disk drive, such as operation of the actuator assembly, can result in read/write errors due to track misregistration. Disc drives with high track densities are particularly prone to track misregistration errors that can arise from excessive mechanical resonances. To alleviate vibration and acoustic noise as well as to provide dampening of mechanical resonances, a layer of damping material can be secured to the outer surface of the base between the PCBA, and the base.

The PCBA is used to compress the damping material against the base so that the damping material can perform its acoustic damping functions. Typically, screws are used to secure the PCBA to the base. The compression of the damping material forms a constrained layer that dissipates acoustic energy and mechanical vibration emitted by the disc drive. Additionally, the damping material acts to electrically insulate the PCBA from the drive housing.

When the PCBA is secured to the base, the pressure that the damping material applies to the PCBA in response to the compression again the base causes the PCBA to deflect outwardly away from the drive housing. With a sufficient amount of deflection, the disc drive can no longer comply with established dimensional form factor. In some instances, the deflection of the PCBA can be great enough that when the disc drive is installed in the designated computing device, damage to the disc drive occurs by contact of the disc drive with the internal components of the computing device.

SUMMARY

An acoustic damping pad is provided to alleviate vibration and acoustic noise. The acoustic damping pad includes a first surface and an opposing second surface that are defined by a periphery. A first set of perforations extend between the first surface and the second surface of the acoustic damping pad. Each adjacent perforation in the first set of perforations is uniformly spaced apart from each other across a first select surface area of the first surface and across a corresponding first select surface area of the opposing second surface to form a uniform pattern.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
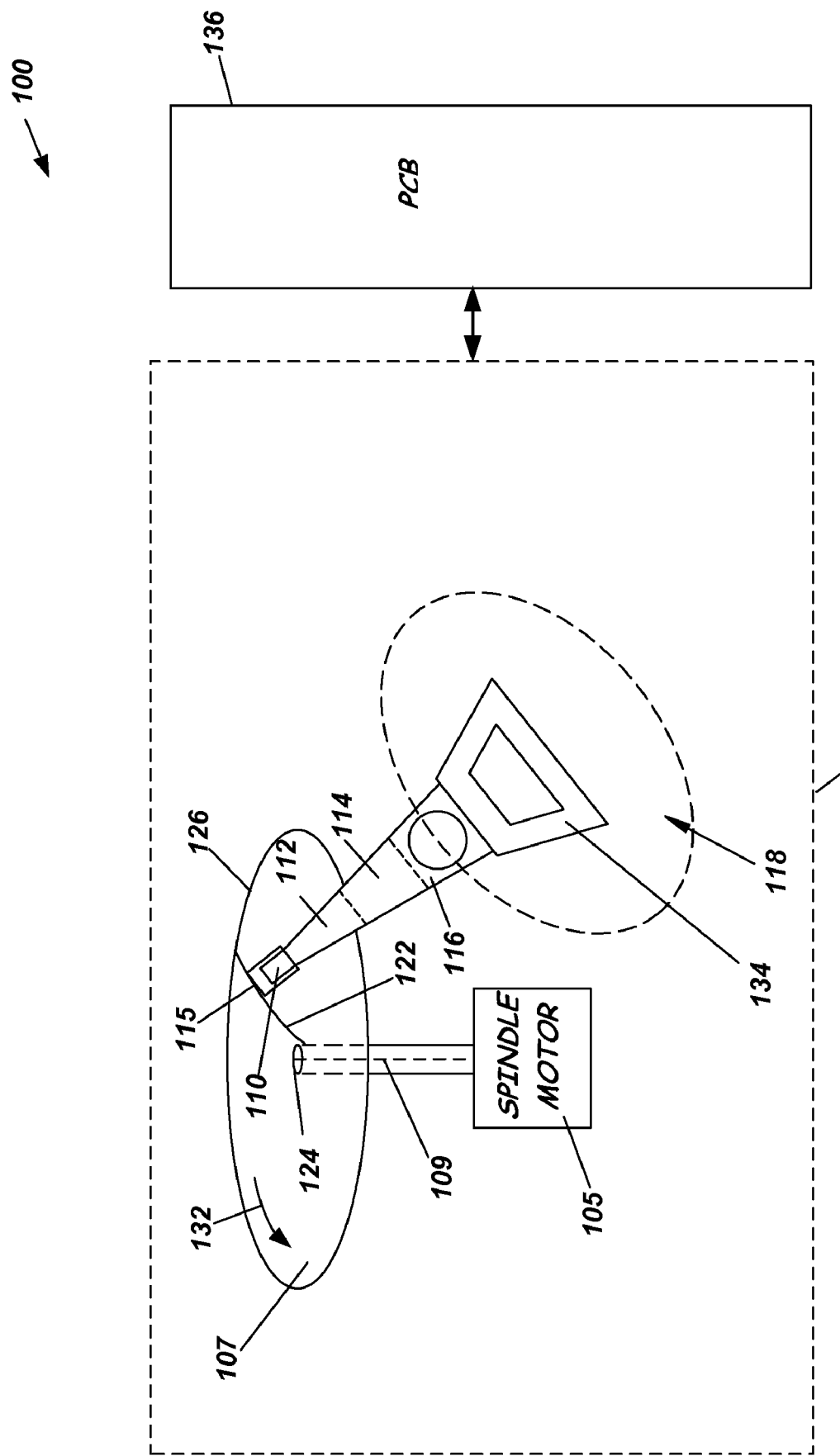
FIG. 1 illustrates a simplified schematic diagram of a data storage system.

FIG. 1 illustrates a simplified schematic diagram of a data storage system 100 in which one or more embodiments of the present disclosure are useful. In one embodiment, data storage system 100 includes a disc drive. One or more embodiments of the present disclosure are also useful in other types of data storage and non-data storage systems.

Data storage system 100 includes an enclosure 101 that encloses a plurality of components such as a disc medium 107. Those skilled in the art should recognize that disc drive 100 can contain a single disc, as illustrated in FIG. 1, or multiple discs. As illustrated in FIG. 1, disc 107 is mounted on a spindle motor 105 for rotation about central axis 109. Each disc surface has an associated slider 110. Each slider 110 carries a read/write head for communication with the surface on the disc. Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126.

Figure 2:
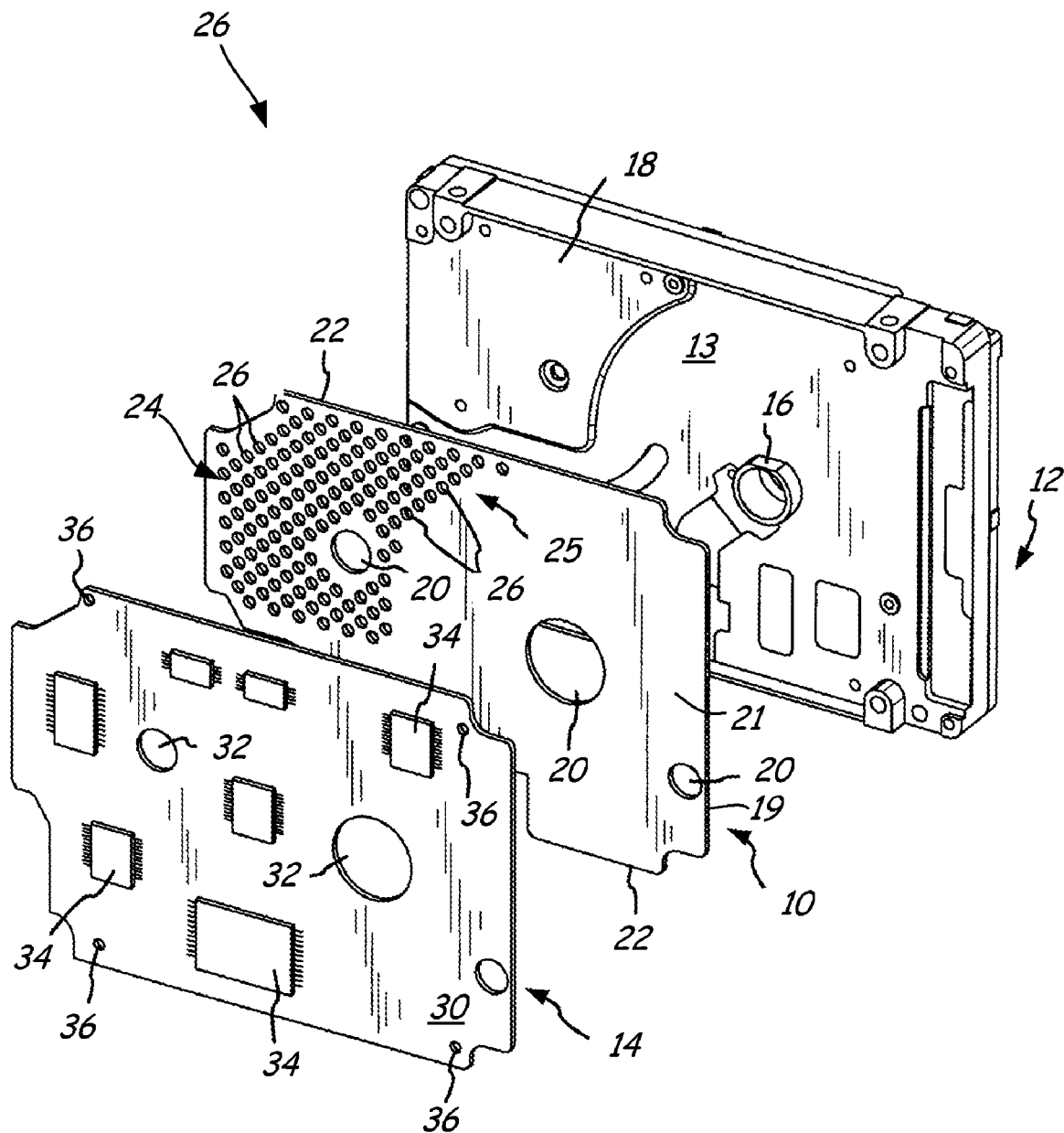
FIG. 2 is an exploded perspective view of the data storage system illustrated schematically in FIG. 1 including an embodiment of an acoustic damping pad.

FIG. 2 illustrates data storage system 100 including one embodiment of an acoustic damping pad 10 compressed between a base 12, and a printed circuit board assembly (PCBA) 14. Base 12 forms a portion of the enclosure 101 (FIG. 1) of data storage system 100. Acoustic damping pad 10 is secured to base 12, and PCBA 14 is mounted over pad 10 to base 12. Although not illustrated in FIG. 2, in some embodiments, acoustic damping pad 10 is compressed between a top cover (not illustrated) and PCBA 14 if PCBA 14 is configured for mounting to a top cover of a data storage system.

Base 12 can have a plurality of irregularities formed on an outer surface 13 thereof. In FIG. 2, base 12 can comprise a protrusion 16 to accommodate a spindle motor. A raised area 18 may also protrude from base 12 to accommodate internal components in data storage system 100, such as the magnets and magnet plates that cooperate with the voice coil of the actuator (FIG. 1). Accordingly, surface 13 of base 12 is not simply planar, but has various irregularities formed thereon. In one embodiment when acoustic damping pad 10 is compressed between PCBA 14 and base 12, raised areas on base 12, such as raised area 18 and protrusion 16, can apply pressure on acoustic damping pad 10 which can consequently deflect or put stress on PCBA 14 in regions that correspond with the raised areas.

Acoustic damping pad 10 includes a first surface 19 and an opposing second surface 21 and is defined by a periphery 22. As shown, acoustic damping pad 10 is not simply rectangular shaped, and can have various features formed on periphery 22 to accommodate the corresponding irregularities formed on base 12. Additionally, acoustic damping pad 10 can comprise one or more openings 20 that accommodate the irregularities in base 12. For example, larger hole 20 may be provided to accommodate protrusion 16.

PCBA 14 comprises a substrate 30 including a plurality of components formed thereon, such as various electronic components 34. Substrate 30 may also comprise one or more openings 32 to accommodate the irregular features protruding from base 12. Additionally, PCBA 14 includes a plurality of screw holes 36 which receive a plurality of screws (not shown) that compress first surface 19 of acoustic damping pad 10 against base 12 and also secures PCBA 14 to base 12. In response to the screws that compress first surface 19 of acoustic damping pad 10 against base 12, acoustic damping pad 10 can apply stress on PCBA 14. Such stress can cause PCBA 14 to be deflected outwardly away from the data storage system enclosure. Deflection of PCBA 14 is undesirable especially in regions of the PCBA where the thickest components 34 are located on substrate 30. Since PCBA 14 and acoustic damping pad 10 are usually only fastened to the base around their peripheries, PCBA 14 can also bow or deflect around the central area of the PCBA based on pressure derived from the compression on acoustic damping pad 10 by the plurality of screws.

Figure 3:
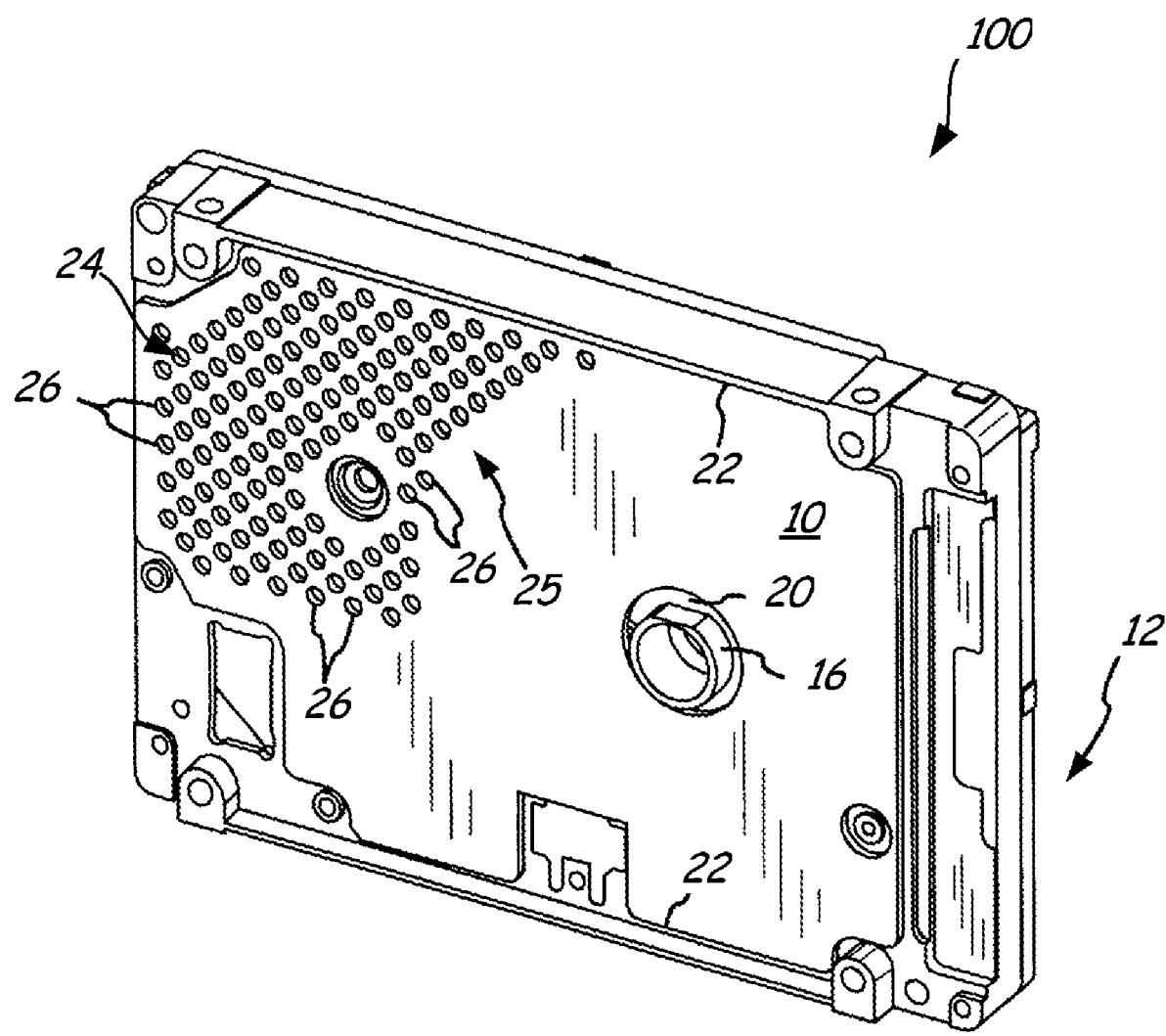
FIG. 3 is a perspective view of the acoustic damping pad of FIG. 2 secured to a base.

With reference to FIGS. 2 and 3, acoustic damping pad 10 includes a perforation pattern 24 comprising a first set of perforations 26 that extend between first surface 19 and second surface 21 of acoustic damping pad 10. Each adjacent perforation 26 is uniformly spaced apart from each other across a first select surface area 25 of first surface 19 and a corresponding first select surface area (hidden from view) of second surface 21 to form a uniform pattern 24. In FIG. 3, the first set of perforations 26 are shown as having substantially similar sizes and shapes. It should be noted, however, that first set of perforations 26 can each include different sizes and shapes. For example, other geometric shapes besides circular shapes (as illustrated) can be used for first set of perforations 26, such as ellipses, rectangles and etc. Different sizes and shapes allow acoustic damping pad 10 to capture different acoustic signatures.

In the embodiment illustrated in FIGS. 2 and 3, the first set of perforations 26 can be located on a select area of acoustic damping pad 10 which corresponds with areas of PCBA 14 that are under deflection. For example, first set of perforations 26 is located on a select area of acoustic damping pad 10 which abuts the raised area 18 on base 12. As shown, first set of perforations 26 generally follows the shape of raised area 18, and thus provides some additional flexibility for acoustic damping pad 10 at that location to prevent excess stress on PCBA 14. Other areas of deflection on PCBA 14 can be determined by conducting a finite element analysis on PCBA 14. Such an analysis can aid in selectively locating perforation pattern 24 on acoustic damping pad 10 in locations that correspond to locations on PCBA 14 which has the greatest amount of deflection.

Figure 4:
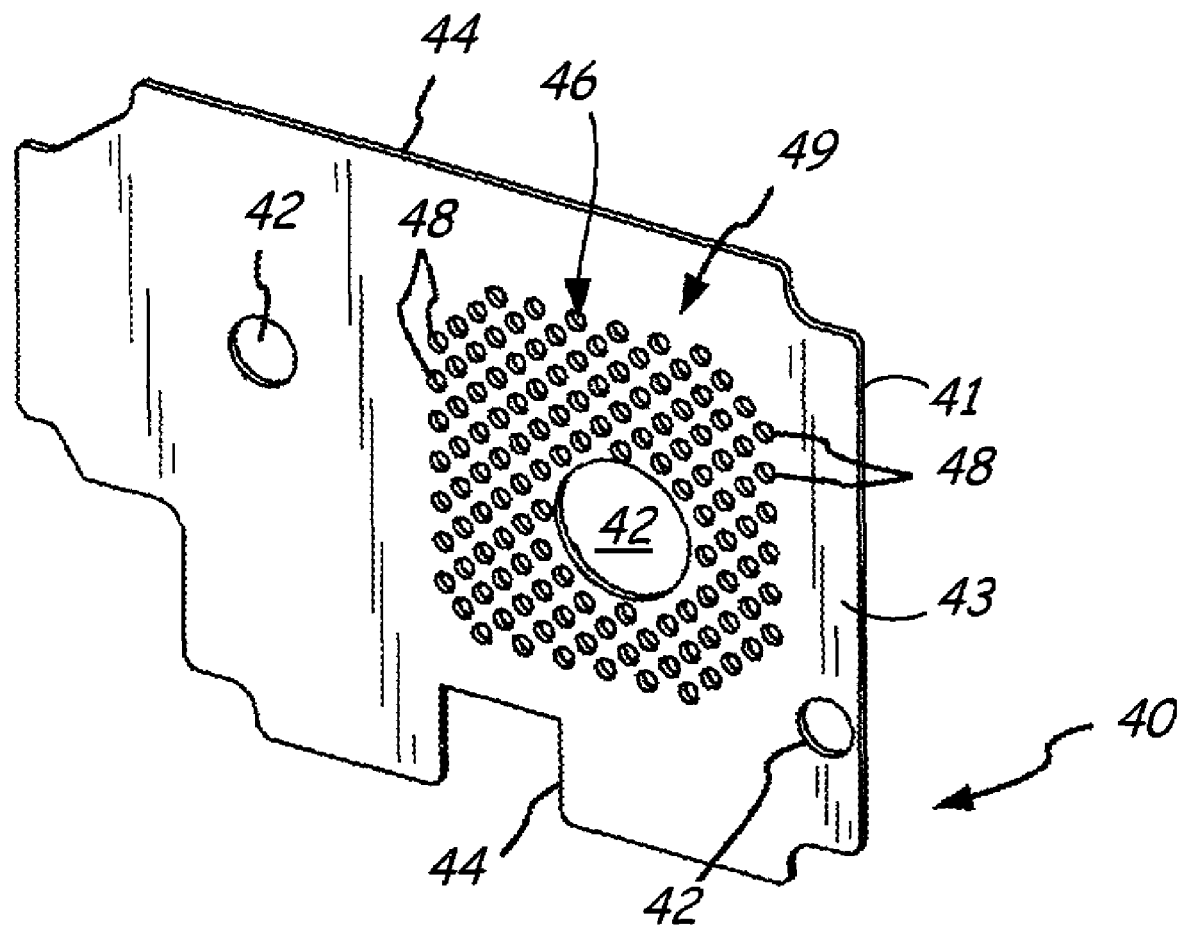
FIG. 4 is a perspective view of an acoustic damping pad.

FIG. 4 illustrates another embodiment of an acoustic damping pad 40. In this embodiment, acoustic damping pad 40 includes a periphery 44 having a first surface 41 and an opposing second surface 43 with the same general shape and configuration as acoustic damping pad 10 illustrated in FIGS. 2 and 3. Acoustic damping pad 40 also includes openings 42 that accommodate irregularities on the outer surface of a base. Acoustic damping pad 40 includes a perforation pattern 46 comprising a first set of uniformly spaced apart perforations 48 that is provided at a location different than the location of perforation pattern 24 on acoustic damping pad 10 illustrated in FIGS. 2 and 3. First set of perforations 48 extend between first surface 41 and second surface 43. Each adjacent perforation 48 is uniformly spaced apart from each other across a first select surface area 49 of first surface 41 and a corresponding first select surface area (hidden from view) of second surface 43 to form uniform pattern 24.

Although perforation pattern 46 includes a first set of perforations 48 that are circular in geometric shape like perforation pattern 24 of acoustic damping pad 10, a distribution shape of perforation pattern 46 is different from a distribution shape of perforation pattern 24 on acoustic damping pad 10. Perforation pattern 46 with first set of perforations 48 can be provided on acoustic damping pad 40 for a base having a different configuration of surface irregularities than that of base 12 illustrated in FIG. 1. For example, a finite stress element analysis might indicate that the most advantageous placement of perforations 48 are generally about the larger central opening 42 of which is provided to accommodate a large protrusion for a base having a large spindle motor. Therefore, in FIG. 4, the first set of perforations 48 is included in first select area 49 of first surface 41, which is formed about the larger central opening 42. In addition, first set of perforations 48 tend to be positioned at or near the central area of acoustic damping pad 40 which correspondingly abuts the central area of a PCBA, such as PCBA 14. Such a central position helps eliminate the PCBA from deflecting outwardly due to compression of acoustic damping pad 40 by the plurality of screws. Again, other geometric shapes besides circular shapes (as illustrated) can be used for first set of perforations 26, such as ellipses, rectangles and etc. Different sizes and shapes allow acoustic damping pad 40 to capture different acoustic signatures.

Figure 5:
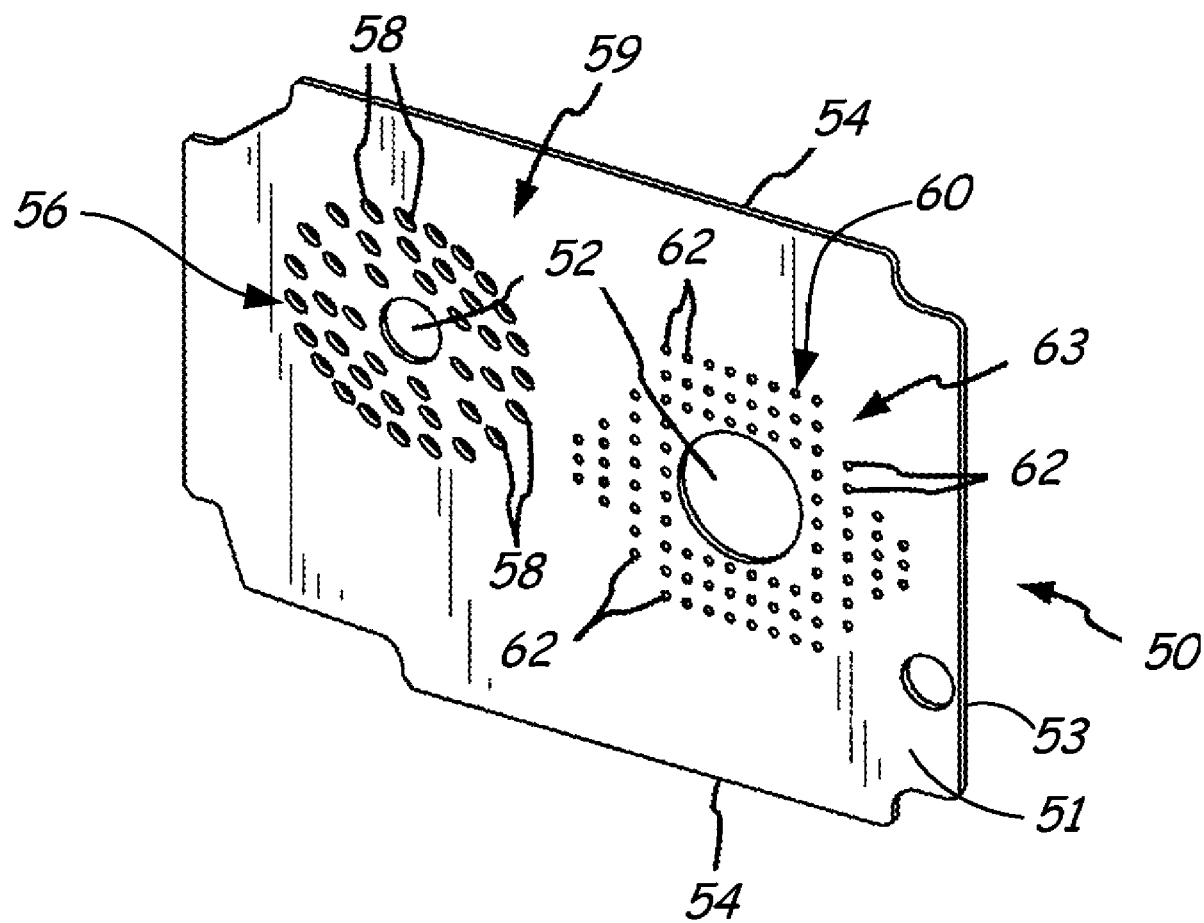
FIG. 5 is a perspective view of an acoustic damping pad.

FIG. 5 illustrates yet another embodiment of an acoustic damping pad 50. In the embodiment illustrated in FIG. 5, acoustic damping pad 50 has a different periphery 54 than the acoustic damping pad peripheries 22 and 44 of FIGS. 2-4. A periphery 54 of acoustic damping pad 50 defines a more rectangular shaped pad having a first surface 51 and an opposing second surface 53. Pad 50 also has a pair of openings 52 to accommodate those corresponding irregularities on the surface of the base (not shown).

FIG. 5 also illustrates acoustic damping pad 50 having two distinct and separate types of perforation patterns 56 and 60. Perforation pattern 56 includes a first set of perforations 58. The first set of perforations 58 provides a distributed pattern around the leftmost opening 52, which accommodates irregularity on a base of a data storage system. First set of perforations 58 extend between first surface 51 and second surface 53 of acoustic damping pad 50. Each adjacent perforation 58 is uniformly spaced apart from each other across a select first surface area 59 of first surface 51 and a corresponding first select surface area (hidden from view) of second surface 53. Each perforation 58 in perforation pattern 56 includes a plurality of oval or elliptical-shaped perforations 58 to form uniform pattern 56. Perforation pattern 60 includes a second set of perforations 62. The second set of perforations 62 provide a distributed pattern around the rightmost opening 52, which accommodates irregularity on a base of a data storage system. Second set of perforations 62 extend between first surface 51 and second surface 53 of acoustic damping pad 50. Each adjacent perforation 62 is uniformly spaced apart from each other across a second select surface area 63 of first surface 51 and a corresponding second select surface (hidden from view) of second surface 53. Each perforation 62 includes a plurality of circular-shaped perforations 62 to form uniform pattern 60. However, it should be noted that perforation pattern 56 and 60 can include other shapes of perforations, besides circular and elliptical. For example, perforations can be rectangular in shape. In one embodiment and as illustrated in FIG. 5, second set of perforations 62 are smaller in size than the first set of perforations 58. In addition, the second set of perforations 62 are generally spaced closer to one another than the first set of perforations 58. Furthermore, in one embodiment, the distribution of perforation pattern 62 is different than that of the distribution of perforation pattern 56.

Thus, FIG. 5 illustrates that the perforation pattern(s) can comprise perforations arranged in different sets of distributions, shapes, sizes and spacing between the perforations. For example, a first set of perforations that form a perforation pattern can be provided for enabling an acoustic damping pad to more easily deflect or bend, while a second set of perforations that form a perforation pattern may be provided to tune the acoustic dampening performance to best match the resonant frequencies of acoustic noise produced by the data storage system. In addition, different sets of distributions, shapes, sizes and spacing between perforations can be optimized depending on the type of application. For example, perforations in an acoustic damping pad being utilized in a data storage system coupled to a small electronic device (such as a cell phone, PDA or digital music player) can be optimized due to the data storage system form factor versus an acoustic damping pad being utilized in a data storage system coupled to a desktop personal computer. Accordingly, the differently distributed, spaced and sized perforations between the perforation patterns are reflective of not only a finite element analysis of the PCBA, but also take into account an optimal perforation pattern to best tune the acoustic dampening performance of the insulating pad base on the application in which it is used.

There are a number of advantages in the above disclosed embodiments. A relatively simple yet effective modification can be made to a pad which remedies undesirable deflection in the PCBA. Form factor requirements may be met with the modified pad, without having to further modify other components of the disc drive. The particular selected perforation pattern can be chosen to provide the necessary amount of increased flexibility of the pad so that an undue amount of force is not transferred to the PCBA. Thus, the ability to specifically tailor the size, type, and number of perforations on the insulating pad provides a comprehensive solution for preventing undesirable PCBA deflection. Additionally, the perforations may be provided for purposes of tuning the acoustic dampening performance of the insulating pad to dampen the acoustic noises associated with operation of the disc drive.

It is to be understood that even though numerous characteristics and advantages of various embodiments of the disclosure have been set forth in the foregoing description, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to an acoustic damping and insulating pad for a disc drive, it will be appreciated by those skilled in the art that the teachings of the present invention can be applied to other types of data storage systems, without departing from the scope and spirit of the present invention.

What is claimed is:

1. An electronic device comprising:
   an enclosure;
   a printed circuit board assembly:
   an acoustic damping pad positioned between the enclosure and the printed circuit board assembly of the electronic device, the acoustic dampening pad comprising:
      a first surface and an opposing second surface defined by a periphery; and
      a first set of perforations extending between the first surface and the second surface of the acoustic damping pad, wherein each adjacent perforation in the first set of perforations is uniformly spaced apart from each other across a first select surface area of the first surface and a corresponding first select surface area of the opposing second surface to form a uniform pattern.

2. The electronic device of claim 1, wherein the periphery of the pad corresponds with a periphery of the printed circuit board assembly which is secured to the acoustic dampening pad.

3. The electronic device of claim 2, wherein the first set of perforations is positioned on the acoustic damping pad at a location that corresponds with a location on the printed circuit board assembly which includes deflection.

4. The electronic device of claim 1, wherein each of the first set of perforations is substantially circular shaped.

5. The electronic device of claim 1, wherein each of the first set of perforations have substantially similar sizes and geometric shapes.

6. The electronic device of claim 1, further comprising a second set of perforations extending between the first surface and the second surface of the acoustic damping pad, wherein each adjacent perforation in the second set of perforations is uniformly spaced apart from each other across a second select surface area of the first surface and a corresponding second select surface area of the opposing second surface to form a uniform pattern.

7. The electronic device of claim 6, wherein each of the second set of perforations have substantially similar sizes and geometric shapes.

8. The electronic device of claim 6, wherein each of the first set of perforations include different sizes and geometric shapes than each of the second set of perforations.

9. The electronic device of claim 6, wherein the first set of perforations and the second set of perforations include geometric shapes selected from one of a circle, an ellipse and a rectangle.

10. An electronic device comprising:
    a housing including an external surface;
    a printed circuit board assembly coupled to the housing, the printed circuit board assembly including at least one area susceptible to deflection when coupled to the housing; and
    an acoustic dampening pad compressively positioned between the external surface of the housing and the printed circuit board assembly, the acoustic dampening pad including a first surface facing the external surface of the housing, a second surface facing the printed circuit board assembly and a plurality of perforations extending between the first surface and the second surface of the pad that are positioned on the acoustic dampening pad in a location that corresponds with the at least one area of deflection of the printed circuit board assembly.

11. The electronic device of claim 10, wherein the plurality of perforations comprises a first set of perforations uniformly spaced apart from each other across a first select surface area of the first surface and a corresponding first select surface area of the opposing second surface to form a uniform pattern.

12. The electronic device of claim 11, wherein each perforation of the first set of perforations comprises similar geometric shapes and sizes.

13. The electronic device of claim 10, wherein the plurality of perforations comprises:
a first set of perforations uniformly spaced apart from each other across a first select surface area of the first surface and a corresponding first select surface area of the opposing second surface to form a uniform pattern; and
a second set of perforations uniformly spaced apart from each other across a second select surface area of the first surface and a corresponding second select surface area of the opposing second surface to form a uniform pattern.

14. The electronic device of claim 13, wherein each perforation of the second set of perforations comprises similar geometric shapes and sizes.

15. The electronic device of claim 13, wherein the wherein each of the first set of perforations include different sizes and geometric shapes than each of the second set of perforations.

16. The electronic device of claim 13, wherein the first set of perforations and the second set of perforations include geometric shapes selected from one of a circle, an ellipse and a rectangle.

17. An electronic device comprising:
an acoustic damping pad compressively positioned between an enclosure and a printed circuit board assembly of the electronic device, the acoustic dampening pad comprising:
a first surface and an opposing second surface defined by a periphery; and
a plurality of perforations extending between the first surface and the second surface of the pad that are positioned in a location that correspond with at least one area of deflection on the printed circuit board assembly, wherein each adjacent perforation is uniformly spaced apart from each other to form at least one uniform pattern.

18. The electronic device of claim 17, wherein the plurality of perforations comprises a first set of perforations uniformly spaced apart from each other across a first select surface area of the first surface and a corresponding first select surface area of the opposing second surface to form a uniform pattern.

19. The electronic device of claim 17, wherein the plurality of perforations comprises:
a first set of perforations uniformly spaced apart from each other across a first select surface area of the first surface and a corresponding first select surface area of the opposing second surface to form a uniform pattern; and
a second set of perforations uniformly spaced apart from each other across a second select surface area of the first surface and a corresponding second select surface area of the opposing second surface to form a uniform pattern.

20. The electronic device of claim 19, wherein the wherein each of the first set of perforations include different sizes and geometric shapes than each of the second set of perforations.

* * * * *